R. P. ROGERS.
Cultivators and Stalk-Cutters.
No. 152,417. Patented June 23, 1874.
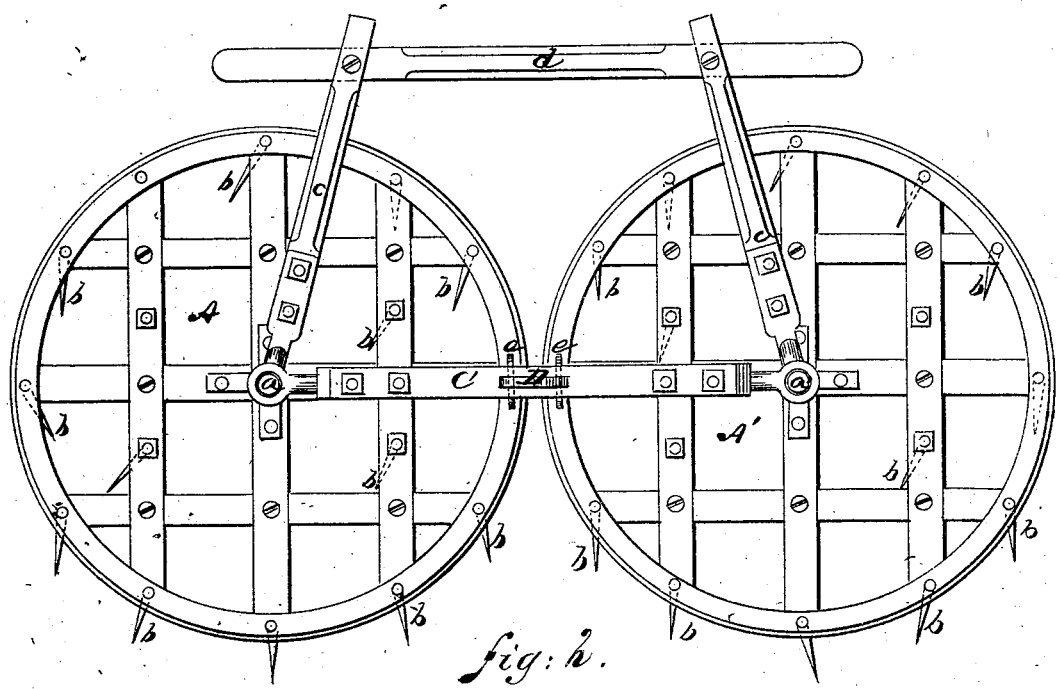
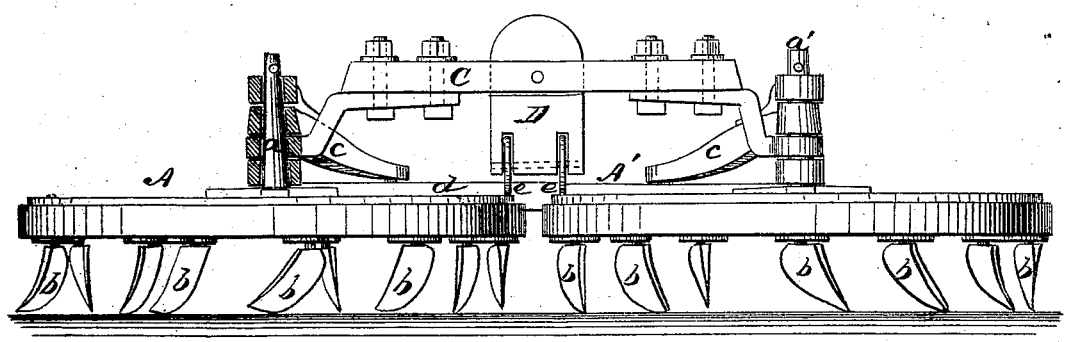
Witnesses: Inventor:
Robt P. Rogers

UNITED STATES PATENT OFFICE.

ROBERT P. ROGERS, OF CLINTON, ILLINOIS.

IMPROVEMENT IN CULTIVATORS AND STALK-CUTTERS.

Specification forming part of Letters Patent No. 152,417, dated June 23, 1874; application filed April 7, 1874.

*To all whom it may concern:*

Be it known that I, ROBERT P. ROGERS, of Clinton, in the county of De Witt and State of Illinois, have invented a new and useful Cultivator and Stalk-Cutter; and that the following is a full, clear, and exact description of the same, reference being had to the accompanying drawings and to the letters of reference marked thereon, making part of this specification.

This invention is in the nature of a revolving cultivator and stalk-cutter; and the invention consists in a revolving stalk-cutter and cultivator provided with revolving knives coupled and operated in the manner hereinafter described.

In the accompanying sheet of drawings, Figure 1 is a plan or top view of my invention, and Fig. 2 a side view of same.

Similar letters of reference indicate like parts in the several figures.

A A' are two circular frames, of wood or other suitable material. These frame-works may be constructed in the form of a grating, as shown in Fig. 1, or they may be constructed with a plain solid surface. Securely affixed to the center of these frames are spindles $a\ a'$, and to the under sides of the circular frames A A' are secured a number of knives, $b$. These knives are arranged and secured in such manner as to freely turn or revolve on the under sides of the circular frames A A', and they are shaped not unlike the plowshare of a cultivator, and have their curved sides brought to a sharp edge. Onto the spindles $a\ a'$ is affixed a cross-bar, C, in such manner as to enable the circles to freely revolve; and in like manner are secured beams or hounds $c$, with a cross-tree or evener, $d$, attached to their front ends. To the cross-bar or coupling C is secured, in a manner rendering it adjustable, a stop-plate, D. Into this stop-plate are secured two friction-wheels, $e$, in such manner as will enable said friction-wheels to bear upon the outer edges of the circular frames A A'.

My cultivator and stalk-cutter being constructed substantially as above described, it is operated by attaching the team to the evener $d$, and as the device is drawn through the cornfield the obstruction of the soil against the knives $b$ causes the circular frames A A' to turn by means of the spindles $a\ a'$, and also causes the knives to revolve, so that as their curved and sharpened edges are brought in contact with corn-stalks or their roots they are severed, each circular frame A, with its knives, cutting a row, so that as the machine progresses two tracks are cleared or rows of stalks cut, the knives $b$ not only cutting the stalks or their roots, but also acting in the manner of the shares of a cultivator to break up and pulverize the soil.

The cross-bar or coupling C may be so adjusted as to keep the circular frames A A' near or far apart, as desired.

The stop-plate D, with the wheels $e$, may also be adjusted on the cross-bar or coupling in such manner as to allow the circular frames A A' to rise or fall at a greater or less distance from the surface of the ground, so that the knives $b$ will penetrate the soil at any depth desired.

The friction-wheels $e$, by bearing on the outer edge of the circular frames A A', not only regulate the depth at which the knives shall enter the soil and keep the frames in the same plane, but really act as equalizing pivots, insuring the frames A A' revolving freely when drawn by horses.

Having thus described my invention, what I claim as new, and desire to secure by Letters Patent, is—

In a revolving stalk-cutter and cultivator, the combination of revolving circular frames with independently-revolving knives, substantially as and for the purpose described.

ROBERT P. ROGERS.

Witnesses:
JNO. WIGHTWICK,
W. W. GRAHAM.